United States Patent [19]

Brock

[11] Patent Number: 4,638,926

[45] Date of Patent: Jan. 27, 1987

[54] WETTABLE SPRAY BOX

[76] Inventor: James R. Brock, 1401 N. Rhodes St., No. 405, Arlington, Va. 22209

[21] Appl. No.: 793,551

[22] Filed: Oct. 31, 1985

[51] Int. Cl.[4] .......... B67B 7/24

[52] U.S. Cl. .......... 222/82; 222/148; 222/630; 141/70

[58] Field of Search .......... 134/93, 104, 150, 166 R, 134/186; 141/70, 67; 406/108; 422/277, 294; 222/80, 81, 82, 83.5, 85, 87, 88, 190, 630, 148

[56] References Cited

U.S. PATENT DOCUMENTS

| | | | |
|---|---|---|---|
| 2,244,301 | 6/1941 | LeGore | 134/93 |
| 3,193,145 | 7/1965 | Vara | 222/82 |
| 3,724,721 | 4/1973 | Barr | 222/83.5 |
| 3,993,221 | 11/1976 | Boynton | 222/87 |
| 4,045,004 | 8/1977 | Berger | 222/88 |
| 4,332,334 | 6/1982 | Mian | 222/83.5 |

*Primary Examiner*—H. Grant Skaggs
*Attorney, Agent, or Firm*—C. Lamont Whitham

[57] ABSTRACT

A wettable spray box for dispensing wettable agricultural spray powders in a tank of spray equipment so as to protect the operator from exposure to the powders is disclosed. The spray box comprises a box (10) with a lid (12) for attachment to the spray tank. The bottom of the box is fitted with a main pipe (18) which extends into the spray tank. A fill pipe (24) extends part way down the interior of the main pipe (18) and is connected to a source of water. One or more knives (34) within the box (10) are positioned to slit a bag of wettable powder which is inserted into the box. A water injector (40) extends into the slit bag, and a spray head (48) is positioned near the top of the box. An inserted bag is prevented from falling to the bottom of the box (10) by a rack or screen (28). In use, an unopened bag of wettable spray material is inserted into the box (10) and the lid (12) is closed to seal the box. The knife (34) slits open the bag, and water is supplied to both the injector (40) and the spray head (48) to expel the powder from the bag and clean the interior of the box. Additional water is added to the mixture by means of the fill pipe (24) which enhances the flow of chemicals into the spray tank and further mixes the powder in the water.

6 Claims, 4 Drawing Figures

WETTABLE SPRAY BOX

DESCRIPTION

1. Field of the Invention

This invention generally relates to the dispensing of agricultural chemicals and, more particularly, to an attachment to a spray tank which receives a bag of wettable spray powder in a sealable hopper and empties the bag while mixing the powder with water without exposing the operator to the powder.

2. Description of the Prior Art

The use of wettable spay powders in many areas of agriculture including horticulture, viticulture and lawn care has become routine. Various chemicals such as herbicides, insecticides and fungicides are packaged in kraft paper bags and other suitable containers ranging from a few ounces to fifty pounds or more. All require the operator of the spray equipment to open the bag or other container, empty the contents into the spray tank, add water and stir or otherwise agitate the mixture to produce a sprayable suspension of the chemical. Each step of this process exposes the operator to exposure to the chemical. For example, when the bag is initially opened using, for example, a knife, some of the powder is unavoidably picked up by the air. Even more of the powder is picked up by the air when the bag is emptied into the spay tank. The air borne powder may cover parts of the exposed skin of the operator and some may be inhaled. As water is mixed with the powder in the tank, the operator risks having the chemical splashed on his exposed skin. Since the chemicals being used are toxic, some more than others, this repeated exposure of the spray operators to the chemicals is clearly undesirable.

A number of ways have been devised in the past to empty chemical containers while minimizing exposure of an operator of equipment which uses the chemical. However, these have not seen widespread use in agriculture either because the approach taken was specific to a particular application and not readily adapted to use in agriculture or the approach was too complicated and hence too expensive. For example, U.S. Pat. No. 4,332,334 to Mian discloses a dustless bag breaker in which a bag of powdered material is opened and emptied within a protective enclosure. Mechanical flappers are used to beat the powdered material out of the bag after it is slit by a knife which is mounted on a common shaft with the flappers. U.S. Pat. No. 3,724,721 to Barr discloses a sack cutting attachment for a material receiving hopper. In the Barr device, it is necessary to manually grip the ends of the sack and lift upwardly in order to empty the sack. U.S. Pat. No. 3,193,145 to Vara, Sr. discloses a dispenser for powdered materials wherein a bag is placed into a container and, in so doing, the bag is pierced by a liquid solvent supply tube. The powder bearing solvent escapes through the hole pierced in the bag. The Vara, Sr. dispenser is used in the clothes washer of a dry cleaning system. U.S. Pat. No. 3,993,221 to Boynton et al discloses a closed system for liquid concentrate insecticide transfer for agriculture spraying operations. A punch punctures the container to allow the liquid concentrate spray material to drain out of the container. After the spray material has drained out, water is injected via a passage and openings in the punch as the punch is withdrawn and, at the same time, a piston crushes the container.

SUMMARY OF THE INVENTION

It is therefore an object of the present invention to provide an attachment for spray tanks of agriculture spraying equipment which protects the operator from exposure to spray chemicals in wettable powder form.

It is a further object of the invention to provide a device which is simple in construction with no moving parts and therefore inexpensive to manufacture which empties a bag of wettable spray powder into a spray tank without exposing the operator to the toxic effects of the chemical.

It is another object of this invention to provide an easy-to-use and inexpensive yet environmentally safe device for emptying bags of wettable agriculture spray powder into the tank of spray equipment.

According to the invention, a box of suitable size and shape to receive a bag of wettable spray powder is provided with a hinged and sealable lid. The box may be rectangular or cylindrical or other suitable shape dictated only by the size and shape of the bag it is to receive and economies of manufacturing. The lid covers a top opening in the box and is provided with a hasp or clasp or other suitable locking means to secure the lid in sealing engagement with the top rim of the box. The bottom exterior of the box is fitted with a pipe which fits into a filler opening of a spray tank. The top of this pipe is provided with a gasket to provide a seal between the box and the tank. A fill pipe is provided within this main pipe and extends out the side of the box to a valve for making a water connection. Inside the box are one or more knives for slitting open a bag when it is inserted into the box. Water injectors extend into the slit bag, and a water spray head is provided near the top of the box. An inserted bag is prevented from falling to the bottom of the box by a stainless screen. The box may be made of plexiglass or stainless steel or other noncorrosive material and provided with noncorrosive fittings, and while the preferred embodiment of the invention is fabricated as an attachment for a spray tank, it is possible to manufacture the invention as an integral part of a spray tank.

In operation, an unopened bag of wettable spray material is placed into the box and the lid closed and clamped to seal the box. The knife or knives in the box slit open the bag under the force of gravity, and water is supplied to both the injectors and the spray head. The combined action empties the bag and wets the powder without exposing the operator to the powder. Additional water is added to the mixture by means of the fill pipe to provide the recommended ratio of water and powder.

BRIEF DESCRIPTION OF THE DRAWINGS

The foregoing and other objects, aspects and advantages of the invention will be better understood from the following detailed description of the preferred embodiments of the invention with reference to the drawings, in which.

DETAILED DESCRIPTION OF THE PREFERRED EMBODIMENTS OF THE INVENTION

Figure 1:
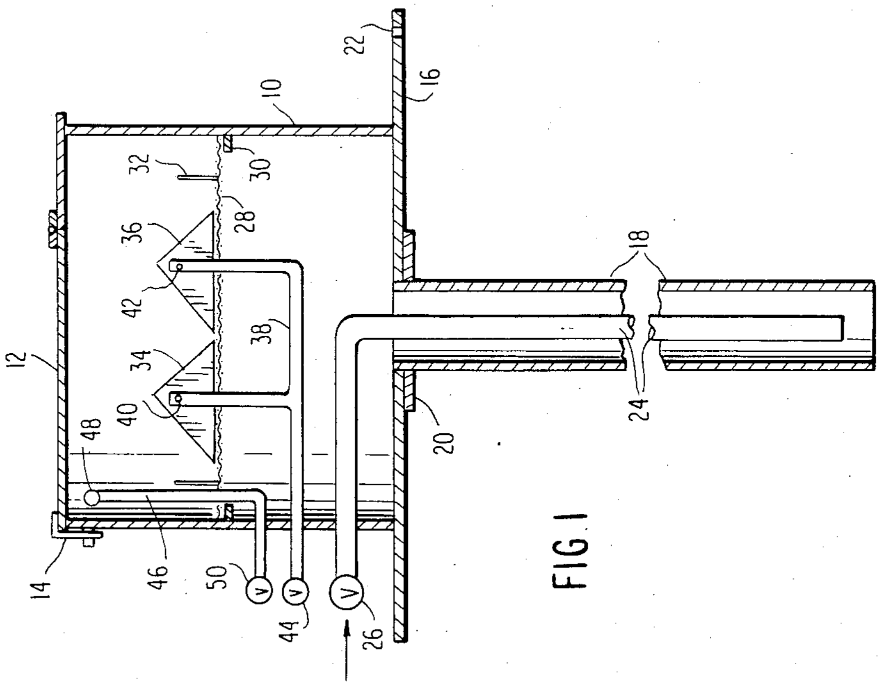
FIG. 1 is a cross-sectional view of a first embodiment of the invention.

Referring now to the drawings, and more particularly to FIG. 1, there is shown a first embodiment of the invention in the form of a prototype made of plexiglass. This prototype was tested and used under field conditions to demonstrate feasibility and ease of use of the invention. The prototype comprises a cylindrical box 10 with a hinged lid 12. The box 10 is made of ⅛" plexiglass, and in the prototype tested, in 15" in diameter and 12" high. This box is only large enough to receive small bags, in the range of three to five pounds, of wettable powder, but it will be understood that larger boxes capable of receiving bags of fifty pounds or more can easily be constructed. Such boxes might conveniently be rectangular in cross-section corresponding to the shape of these larger bags. The lid 12 is provided with a seal or gasket that mates with the rim of the top of the box, and a hasp 14 is used to tightly seal the lid to the box 10.

The bottom rim of the box 10 is joined to a base 16 which is generally square and extends beyond the outer diameter of the box. The base 16 of the box 10 is provided with a main pipe 18 which extends into the spray tank. This pipe in the prototype is a 3" diameter pipe of plexiglass which extends to within 2" of the bottom of the tank in order to reduce foaming of the spray material as the tank is filled. The junction of the pipe 18 and the base 16 is provided with a gasket 20 to provide a seal between the spray box and the tank. The base 16 is provided with screw holes 22 at its corners, and these holes receive hold-down screws which attach to the spray tank frame and assure a good seal between the spray box and the spray tank. A 1" PVC fill pipe 24 extends concentrically with and partially down the length of main pipe 18. The pipe 24 is shorter than the pipe 18 so that water injected by it into the main pipe 18 will enhance the flow of chemicals from the main pipe into the spray tank and, in so doing, further mix the wettable spray powder and the water. The pipe 24 extends out the side of the box 10 to a valve 26 which is connected to a source of water under pressure. It will be understood that this valve and other valves to be described are connected to the water supply in common with backflow protection.

In the interior of the box 10 is a ⅛" mesh stainless steel screen 28 supported above the bottom of the box by a flange 30. Optional wire guides 32 attached to the screen 28 are used to position the bag of wettable spray powder when it is inserted into the box 10. The screen 28 prevents the bag from falling to the bottom of the box. A pair of knives 34 and 36 extend above the screen 28. These knives are triangular in shape and have sharp, upwardly projecting points. A pipe 38 connects to injectors 40 and 42 positioned near the sharp points of the knives 34 and 36, respectively. The pipe 38 extends out the side of the box 10 and connects to the source of water under pressure via valve 44. Third pipe 46 in the box 10 extends up toward the top of the box to a spray head 48. The pipe 46 also extends out the side of the box 10 and connects to the source of water under pressure via valve 50.

In operation, the operator first makes a connection to a source of water under pressure. Valve 26 is opened and the spray tank is partially filled. Valve 26 is then closed. The operator then opens the lid 12 and inserts a bag of wettable spray powder then closes the lid. The knives 34 and 36 slit the bag under the force of gravity. Alternatively, the dimensions of the box can be made so that the act of closing the lid 12 forces the bag on to the knives. The lid is latched, and valve 44 is opened to supply water to the injectors 40 and 42 to expel the wettable powder from the bag. The clean bag is then removed and if more bags are to be emptied, the process is repeated until the required amount of chemical has been added to the spray tank. Valve 50 is then opened to supply water to the spray head 48 and clean the interior of the box 10. Alternatively, this may be done after each bag is emptied. Valve 50 is then closed, and valve 26 is opened again to finish filling the spray tank.

Figure 2:
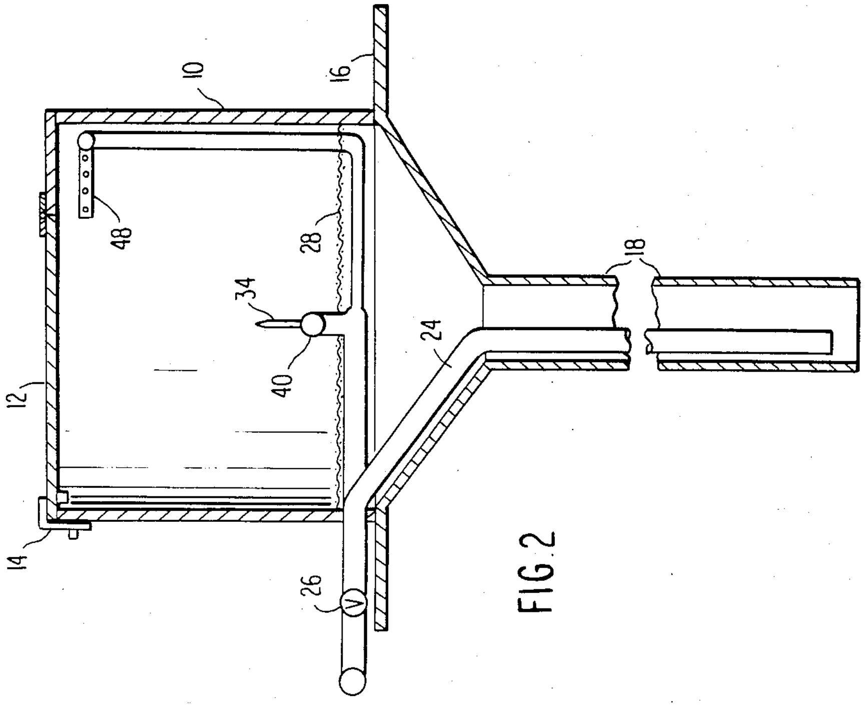
FIG. 2 is a cross-sectional view of a second embodiment of the invention.

FIG. 2 shows a production model of the invention. In FIG. 2, the same reference numerals as used in FIG. 1 designate the same or corresponding parts, and because of the similarities between the prototype and production models, a detailed description of FIG. 2 will not be given. It will be noticed, however, that the box 10, base 16 and main pipe 18 are integrally formed and that the base 16 has a generally funnel shape. Also, the fill pipe 24 is eccentric within main pipe 18, but this does not adversely affect the entrainment of chemicals flowing in pipe 18.

Figure 3:
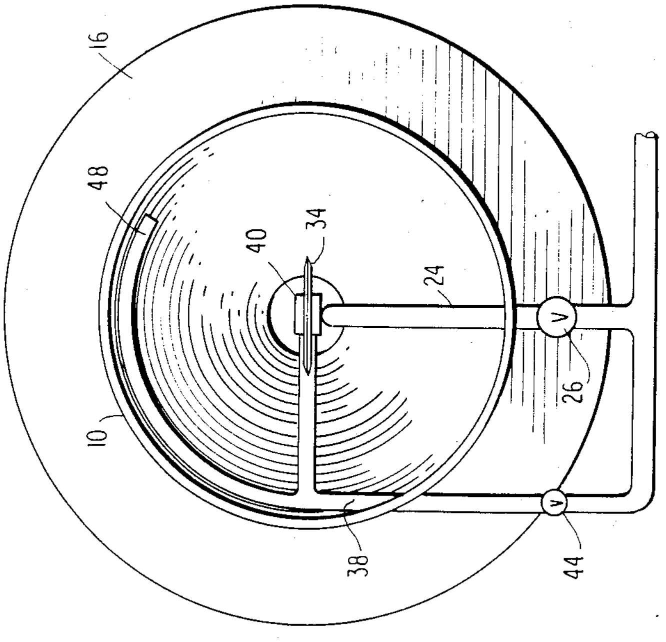
FIG. 3 is a top view showing the interior of the embodiment of FIG. 2.

As best shown in FIG. 3, the production model has been simplified by connecting the spray head 48 in common with injector 40 to pipe 38 and valve 44. Thus, water is supplied to both the injector 40 and the spray head at the same time to simultaneously expel the wettable spray powder from the bag and clean the interior of the box 10.

Figure 4:
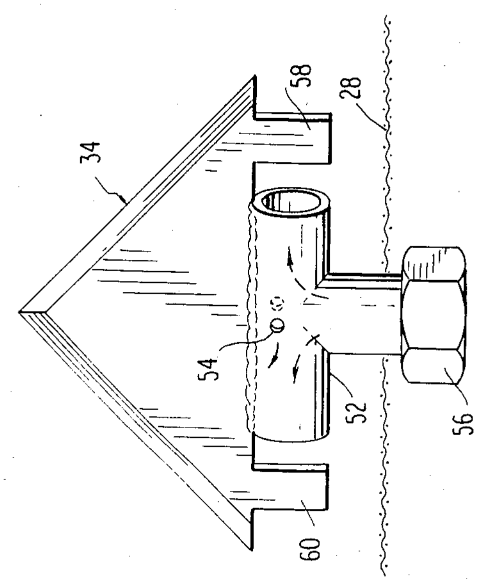
FIG. 4 is a detailed view of the knife and water injector used in the embodiment of FIG. 2.

As shown in both FIGS. 3 and 4, only a single knife 34 located in the center of the box 10 is used in the production model thereby further reducing both the expense of manufacture and maintenance. This may be a replaceable item comprising the knife and injector as an integral screw fitting to the pipe 38 as shown in more detail in FIG. 4. The knife 34 may be made of brass and brazed onto a brass T-fitting 52 which comprises the injector. The T-fitting 52 is open at the ends of the arms of the T to provide the main outlets for the water. In addition, small holes 54 may be drilled on either side of the T-fitting to provide additional outlets for the injector. The base 56 of the T-fitting 52 is provided with a screw fitting for attachment to the pipe 38. Depending from the lower ends of the knife 34 are stream deflectors 58 and 60 which are integral with the base of the knife. These stream deflectors are simple projections which are proximate to the main outlets of the injector and serve to cause the water stream to be diffusely injected into the bag to provide efficient and complete expelling of the powder contained in the bag.

While the invention has been described with reference to certain preferred embodiments, those skilled in the art will recognize that modifications and variations can be made in construction and material without departing from the scope and spirit of the invention.

Having thus described my invention, what I claim to be new and desire to secure by Letters Patent is set forth below:

1. A wettable spray box for dispensing wettable agricultural spray powders in a tank of spray equipment so as to protect the operator from exposure to the powders comprising:

a closable and sealable box for attachment to said tank for receiving a bag of wettable spray powder, said box having a base with an opening, said base being mateable with an opening of said tank to provide a direct access from the base opening to the tank;

a fill pipe for connection to a source of water under pressure and extending into said box to supply water to said tank through the base opening of said box;

a stationary knife within said box positioned to slit open a bag of wettable powder when it is inserted into said box, wettable powder from said bag being allowed to fall freely through the base opening of said box into said tank; and an injector nozzle adjacent a cutting edge of said stationary knife for connection to a source of water under pressure to inject water into an opened bag of wettable powder and expel the powder into said tank.

2. The wettable spray box as recited in claim 1 further comprising:

a main pipe integral with said base and extending into said tank; and said fill pipe extending part of the way down the interior of said main pipe.

3. The wettable spray box as recited in claim 1 further comprising a rack or screen supported within the interior of said box to prevent a bag of wettable powder inserted into said box from falling to the bottom of said box.

4. The wettable spray box recited in claim 1 further comprising a spray head connection to a source of water under pressure and positioned near the top of the interior of said box to emit a water spray for cleaning the interior of the box.

5. The wettable spray box recited in claim 4 further comprising:

a first valve connected to said fill pipe and operable to supply water to said tank via said fill pipe; and a second valve connected to said injector nozzle and operable to supply water to said injector nozzle for expelling wettable powder from a bag inserted into said box.

6. The wettable spray box as recited in claim 5 wherein said second valve is also connected to said spray head to simultaneously supply water to said spray head to clean the interior of said box as wettable powder is expelled from a bag inserted into said box.

* * * * *